(12) United States Patent
Elomari

(10) Patent No.: US 9,493,363 B2
(45) Date of Patent: Nov. 15, 2016

(54) METHOD FOR MAKING NES FRAMEWORK TYPE ZEOLITES

(71) Applicant: Saleh Ali Elomari, Fairfield, CA (US)

(72) Inventor: Saleh Ali Elomari, Fairfield, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 316 days.

(21) Appl. No.: 14/498,205

(22) Filed: Sep. 26, 2014

(65) Prior Publication Data

US 2016/0090309 A1   Mar. 31, 2016

(51) Int. Cl.
   *C01B 39/48*   (2006.01)
   *C01B 39/04*   (2006.01)
   *B01J 29/70*   (2006.01)

(52) U.S. Cl.
   CPC ............... *C01B 39/48* (2013.01); *B01J 29/70* (2013.01); *C01B 39/04* (2013.01)

(58) Field of Classification Search
   CPC ......... C01B 39/04; C01B 39/48; B01J 29/70
   See application file for complete search history.

(56) References Cited

U.S. PATENT DOCUMENTS

| | | | |
|---|---|---|---|
| 5,102,641 A | 4/1992 | Casci et al. | |
| 5,254,514 A | 10/1993 | Nakagawa | |
| 5,641,393 A | 6/1997 | Nakagawa | |
| 6,616,911 B2 * | 9/2003 | Elomari | B01D 53/86 423/706 |
| 7,682,599 B2 | 3/2010 | Burton, Jr. | |
| 2002/0081262 A1 | 6/2002 | Elomari | |
| 2007/0104643 A1 | 5/2007 | Holland | |
| 2014/0147378 A1 | 5/2014 | Davis et al. | |
| 2016/0090309 A1 * | 3/2016 | Elomari | B01J 29/70 423/704 |

OTHER PUBLICATIONS

Helmkamp et al, "Synthesis of Porous Silicates", Annui. Res. Mater. Sci. (1995) pp. 161-192.*
M.D. Shannon, J.L. Casci, P.A. Cox and S.J. Andrews "Structure of the two-dimensional medium-pore high-silica zeolite NU-87" Nature, 1991, 353, 417-420.
Y. Nakagawa "Use of Diels-Alder Derived Templates to Prepare Zeolites with Multidimensional Pore Systems" Stud. Surf. Sci. Catal., 1994, 84, 323-330.
PCT International Search Report, PCT/US2015/014544, mailed May 8, 2015.
J.L.Casci, P.A. Cox, R.P.G. Henney, S. Maberly and M.D. Shannon "Template Design for High-Silica Zeotypes: A Case Study of Zeolite NES Synthesis Using a Designed Template" Stud. Surf. Sci. Catal. 2004, 154, 110-117.

* cited by examiner

*Primary Examiner* — David M Brunsman

(57) ABSTRACT

This disclosure is directed to a method for preparing NES framework type zeolites using a colloidal aluminosilicate composition in the presence of an N-cyclopentyl-N-methylpyrrolidinium cation as a structure directing agent.

5 Claims, No Drawings

METHOD FOR MAKING NES FRAMEWORK TYPE ZEOLITES

TECHNICAL FIELD

This disclosure relates generally to methods for preparing NES framework type zeolites.

BACKGROUND

Zeolites are crystalline aluminosilicate compositions which are microporous and which are formed from corner sharing $AlO_2$ and $SiO_2$ tetrahedra. Numerous zeolites, both naturally occurring and synthetically prepared, are used in various industrial processes. Synthetic zeolites are prepared via hydrothermal synthesis employing suitable sources of Si, Al and structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers.

Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces as well as on internal surfaces within the pore.

Zeolites having the NES framework type have a two-dimensional pore system with the approximate dimensions 4.8×5.7 Å (Ch. Baerlocher et al. "*Atlas of Zeolite Framework Zeolite Types*," Sixth Revised Edition, Elsevier, 2007). An example of a zeolite having the NES framework type is NU-87. U.S. Pat. No. 5,102,641 discloses NU-87 and its synthesis using a polymethylene alpha, omega-diammonium cation as a structure directing agent.

U.S. Pat. Nos. 5,254,514 and 5,641,393 disclose zeolite SSZ-37 and its synthesis using an N,N-dimethyl-4-azoniatricyclo[5.2.2.0$^{(2,6)}$]undec-8-ene cation as a structure directing agent. The structure of SSZ-37 has not yet been finally established, but it appears to be related to NU-87 (Y. Nakagawa, *Stud. Surf. Sci. Catal.* 1994, 84, 323-330), so that for the purposes of this disclosure, SSZ-37 should also be included among the zeolites having the NES framework type.

It has now been found that NES framework type zeolites can be prepared using a colloidal aluminosilicate composition in the presence of an N-cyclopentyl-N-methylpyrrolidinium cation as a structure directing agent.

SUMMARY

In one aspect, there is provided a method of preparing an NES framework type zeolite by contacting under crystallization conditions (1) a colloidal aluminosilicate composition; (2) an N-cyclopentyl-N-methylpyrrolidinium cation as a structure directing agent; (3) at least one source of an element selected from Groups 1 and 2 of the Periodic Table; and (4) hydroxide ions.

In another aspect, there is provided a process for preparing an NES framework type zeolite by: (a) preparing a reaction mixture containing (1) a colloidal aluminosilicate composition; (2) an N-cyclopentyl-N-methylpyrrolidinium cation as a structure directing agent; (3) at least one source of an element selected from Groups 1 and 2 of the Periodic Table; (4) hydroxide ions; and (5) water; and (b) subjecting the reaction mixture to crystallization conditions sufficient to form crystals of the NES framework type zeolite.

The present disclosure also provides an NES framework type zeolite having a composition, as-synthesized and in the anhydrous state, in terms of mole ratios, as follows:

| | Broad | Exemplary |
|---|---|---|
| $SiO_2/Al_2O_3$ | 25 to 400 | 25 to 200 |
| $Q/SiO_2$ | 0.02 to 0.10 | 0.02 to 0.10 |
| $M/SiO_2$ | 0.02 to 0.15 | 0.02 to 0.15 | wherein Q is an N-cyclopentyl-N-methylpyrrolidinium cation; and M is selected from the group consisting of elements from Groups 1 and 2 of the Periodic Table.

DETAILED DESCRIPTION

Introduction

The following terms will be used throughout the specification and will have the following meanings unless otherwise indicated.

The term "framework type" is used in the sense described in the "*Atlas of Zeolite Framework Types*," Sixth Revised Edition, Elsevier, 2007.

The term "colloid" and other like terms including "colloidal," "sol," and the like refer to a two-phase system having a dispersed phase and a continuous phase. The colloids disclosed herein have a solid phase dispersed or suspended in a continuous or substantially continuous liquid phase, typically an aqueous solution. Thus, the term "colloid" encompasses both phases, whereas "colloidal particles" or "particles" refer to the dispersed or solid phase.

As used herein, the numbering scheme for the Periodic Table Groups is as disclosed in *Chem. Eng. News*, 63(5), 27 (1985).

In preparing NES framework type zeolites, an N-cyclopentyl-N-methylpyrrolidinium cation is used as the structure directing agent ("SDA"), also known as a crystallization template. The SDA useful for making the zeolite is represented by the following structure (1):

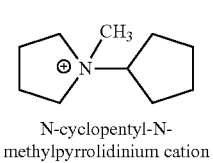

N-cyclopentyl-N-methylpyrrolidinium cation

The SDA cation is associated with anions which can be any anion that is not detrimental to the formation of the zeolite. Representative anions include elements from Group 17 of the Periodic Table (e.g., fluoride, chloride, bromide and iodide), hydroxide, sulfate, tetrafluoroborate, acetate, carboxylate, and the like.

Reaction Mixture

In general, the NES framework type zeolite is prepared by: (a) preparing a reaction mixture containing (1) a colloidal aluminosilicate composition; (2) an N-cyclopentyl-N-methylpyrrolidinium cation as a structure directing agent; (3) at least one source of an element selected from Groups 1 and 2 of the Periodic Table; (4) hydroxide ions; and (5) water; and (b) subjecting the reaction mixture to crystallization conditions sufficient to form crystals of the NES framework type zeolite.

The composition of the reaction mixture from which the zeolite is formed, in terms of mole ratios, is identified in Table 1 below:

TABLE 1

| Components | Broad | Exemplary |
|---|---|---|
| $SiO_2/Al_2O_3$ | 25 to 400 | 25 to 200 |
| $M/SiO_2$ | 0.01 to 0.30 | 0.05 to 0.15 |
| $Q/SiO_2$ | 0.10 to 0.30 | 0.15 to 0.25 |
| $OH/SiO_2$ | 0.10 to 0.50 | 0.20 to 0.30 |
| $H_2O/SiO_2$ | 15 to 50 | 20 to 35 | wherein compositional variables M and Q are as described herein above.

Colloidal aluminosilicate compositions useful in the process described herein, as well as methods of making the colloidal aluminosilicates are disclosed in U.S. Patent Application Publication No. 2007/0104643.

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, acetates, oxalates and citrates thereof.

The reaction mixture can be prepared either batch wise or continuously. Crystal size, morphology and crystallization time of the zeolite described herein can vary with the nature of the reaction mixture and the crystallization conditions.

Crystallization and Post-Synthesis Treatment

In practice, the NES framework type zeolite is prepared by: (a) preparing a reaction mixture as described herein above; and (b) subjecting the reaction mixture to crystallization conditions sufficient to form crystals of the NES framework type zeolite (see, e.g., H. Robson, "*Verified Syntheses of Zeolitic Materials*," Second Revised Edition, Elsevier, 2001).

The reaction mixture is maintained at an elevated temperature until the crystals of the zeolite are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by the skilled artisan that the zeolites described herein can contain impurities, such as amorphous materials, unit cells having framework topologies which do not coincide with the zeolite, and/or other impurities (e.g., organic hydrocarbons).

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product obtained by promoting the nucleation and/or formation of the zeolite over any undesired phases. Seeds can typically be present in an amount of from 0.01 to 10,000 wppm (e.g., from 10 to 1,000 wppm) of the overall reaction mixture.

Once the zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The zeolite can be used as-synthesized, but typically will be thermally treated (calcined). The term "as-synthesized" refers to the zeolite in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by the skilled artisan sufficient to remove the SDA from the zeolite. The SDA can also be removed by photolysis techniques (e.g., exposing the SDA-containing zeolite product to light or electromagnetic radiation that has a wavelength shorter than visible light under conditions sufficient to selectively remove the organic compound from the zeolite) as described in U.S. Pat. No. 6,960,327.

The zeolite can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange and replace it with hydrogen, ammonium, or any desired metal-ion.

Characterization of the Zeolite

NES framework type zeolites made by the process disclosed herein have a composition (in terms of mole ratios), as-synthesized and in the anhydrous state, as described in Table 2 below:

TABLE 2

| | Broad | Exemplary |
|---|---|---|
| $SiO_2/Al_2O_3$ | 25 to 400 | 25 to 200 |
| $Q/SiO_2$ | 0.02 to 0.10 | 0.02 to 0.10 |
| $M/SiO_2$ | 0.02 to 0.15 | 0.02 to 0.15 | wherein compositional variables Q and M are as described herein above.

The NES framework type zeolites synthesized by the process described herein are characterized by their X-ray diffraction pattern. X-ray diffraction patterns representative of NES framework type zeolites can be referenced in the "*Collection of Simulated XRD Powder Patterns for Zeolites*," Fifth Revised Edition, Elsevier, 2007 of the International Zeolite Association. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

EXAMPLES

The following illustrative examples are intended to be non-limiting.

Example 1

Synthesis of N-cyclopentyl-N-methylpyrrolidinium hydroxide

In a 3-necked round bottom flask, a mixture of 71 g of cyclopentanone, 168 g of pyrrolidine, 180 g of anhydrous magnesium sulfate and 800 mL of cyclohexane was heated at reflux. The reaction progress was monitored by NMR and IR analysis by following the disappearance of the ketone signal and the appearance of the olefinic signal of the resulting enamine product. Once the reaction was complete, the reaction mixture was cooled to room temperature and filtered. The filtrate was concentrated on a rotary evaporator at reduced pressure in a hot water bath (75° C.) to remove excess pyrrolidine and the solvent (cyclohexane) to yield 127 g (93% yield) of the desired enamine (1-cyclopentenylpyrrolidine).

The resulting 1-cyclopentenylpyrrolidine was dissolved in 200 mL of ethanol and hydrogenated over 10% Pd on activated carbon (0.05 mole % Pd) at a hydrogen pressure of 60 psig. The hydrogenation was carried out in a glass bottle that was affixed to a hydrogenation Parr while gently rocking. The reaction is usually pressurized twice with hydrogen to 60 psig to ensure completion of the reaction. The reaction mixture was then filtered over CELITE filter aid. The filtrate was concentrated on a rotary evaporator at reduced pressure in a hot water bath (70° C.) to give 121 g of the desired N-cyclopentylpyrrolidine as a colorless oil (>93% yield).

A 3-necked round bottom flask equipped with an overhead stirrer and a reflux condenser was charged with 30 g of N-cyclopentylpyrrolidine and 250 mL of ACS-grade methanol. Then, 52 g of methyl iodide was added to the N-cyclopentylpyrrolidine solution and allowed to stir at room temperature for 36 hours. The reaction mixture was concentrated on a rotary evaporator at reduced pressure in a hot water bath (50° C.) to remove excess methyl iodide and the solvent. The resulting pale yellow powder was washed twice with diethyl ether to remove any residual unreacted amine and any residual halide. The solids were collected by filtration, transferred to a flask and dried on a rotary evaporator at reduced pressure in a hot water bath (75° C.). The reaction afforded 57.5 g of N-cyclopentyl-N-methylpyrrolidinium iodide as an off-white powder (92% yield). The product was confirmed by NMR analysis.

N-Cyclopentyl-N-methylpyrrolidinium iodide (55 g) was dissolved in 200 mL of deionized water in a polyethylene bottle. Then 215 g of BIO-RAD AG® 1-X8 hydroxide-based ion exchange resin was added. An additional 50 mL of deionized water was added. The resulting slurry was stirred gently overnight. The slurry was then filtered and the resin rinsed with additional water. The filtrate and the rinse were collected and analyzed for hydroxide concentration by titrating of a small aliquot with 0.1N HCl. The exchange gave the desired hydroxide as a 0.45 molar solution (91% yield).

Scheme 1 below depicts the synthesis of the N-cyclopentyl-N-methylpyrrolidinium hydroxide.

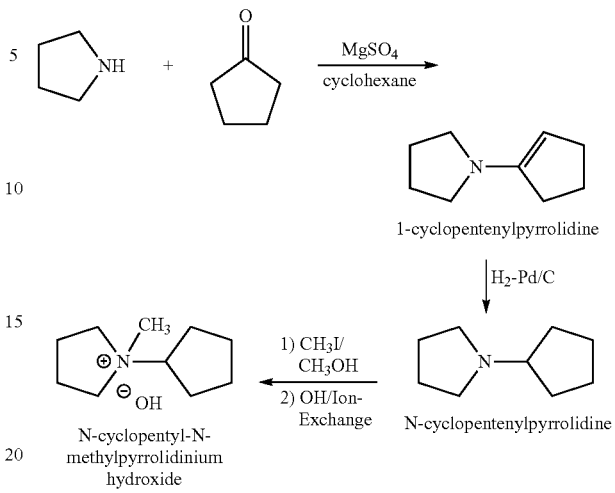

SCHEME 1

Example 2

Synthesis of NES Framework Type Zeolite

In a 23 cc Teflon liner, 4.4 g of a 0.45M solution of N-cyclopentyl-N-methylpyrrolidinium hydroxide (2 mmol), 3 g of a 1N KOH solution, and 5.3 g of a colloidal aluminosilicate (NALCO, 19 wt. % solids, $SiO_2/Al_2O_3$ mole ratio=35) were mixed and stirred with a Teflon spatula until a homogeneous gel was obtained. The resulting gel was capped off and sealed in an autoclave that was affixed to a rotating spit (43 rpm) in an oven and heated at 170° C. The crystallization progress was followed by Scanning Electron Microscopy (SEM) and by monitoring the pH of the reaction gel. The reaction was completed after 18 days to give a clear solution and a fine powder precipitate with a pH of 11.8. The reaction solution was filtered using a fritted glass funnel. The obtained solids were thoroughly rinsed with deionized water (1 L) and were air-dried overnight. Then, the solids were further dried in an oven at 125° C. for 2 hours to yield 1 g of the as-synthesized zeolite.

The as-synthesized material had an X-ray diffraction pattern including the most significant lines as set forth in Table 3 below and showed the product to be pure NES framework type zeolite.

TABLE 3

| 2-Theta | d-Spacing, nm | Relative Intensity (%) |
| --- | --- | --- |
| 7.88 | 1.120 | 79.2 |
| 8.30 | 1.064 | 35.8 |
| 19.18 | 0.462 | 29.9 |
| 20.44 | 0.434 | 100.0 |
| 22.20 | 0.400 | 68.6 |
| 22.56 | 0.394 | 68.2 |
| 23.80 | 0.374 | 32.6 |
| 26.04 | 0.342 | 26.5 |
| 26.62 | 0.335 | 28.4 |
| 27.16 | 0.328 | 60.2 |

Example 3

Calcination of NES Framework Type Zeolite

The as-synthesized product of Example 2 was calcined inside a muffle furnace under a flow of air heated to 595° C.

at a rate of 1° C./minute and held at 595° C. for 5 hours, cooled and then analyzed by powder XRD.

The resultant calcined material had an X-ray diffraction pattern including the most significant lines as set forth in Table 4 below.

TABLE 4

| 2-Theta | d-Spacing, nm | Relative Intensity (%) |
|---|---|---|
| 7.88 | 1.121 | 100.0 |
| 8.36 | 1.057 | 48.7 |
| 19.20 | 0.462 | 35.4 |
| 20.48 | 0.430 | 52.0 |
| 22.32 | 0.398 | 38.0 |
| 22.68 | 0.392 | 23.3 |
| 23.88 | 0.372 | 18.2 |
| 26.06 | 0.342 | 21.5 |
| 26.66 | 0.334 | 39.7 |
| 27.30 | 0.326 | 60.4 |

Example 4

Seeded Synthesis of NES Framework Type Zeolite

Example 2 was repeated except that 50 mg of NES framework type zeolite from a previous synthesis was added as seeds to the reaction mixture. The reaction afforded 1.1 g of pure NES framework type zeolite (as determined by powder XRD) in 7 days versus 18 days without seeding.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing an NES framework type zeolite, comprising:

(a) preparing a reaction mixture containing:
 (1) a colloidal aluminosilicate composition;
 (2) an N-cyclopentyl-N-methylpyrrolidinium cation;
 (3) at least one source of an element selected from Groups 1 and 2 of the Periodic Table;
 (4) hydroxide ions; and
 (5) water; and
(b) subjecting the reaction mixture to crystallization condition sufficient to form crystals of the NES framework type zeolite.

2. The method of claim 1, wherein the zeolite is prepared from a reaction mixture comprising, in terms of mole ratios, the following:

| $SiO_2/Al_2O_3$ | 25 to 400 |
|---|---|
| $M/SiO_2$ | 0.01 to 0.30 |
| $Q/SiO_2$ | 0.10 to 0.30 |
| $OH/SiO_2$ | 0.10 to 0.50 |
| $H_2O/SiO_2$ | 15 to 50 | wherein:
 (1) M is selected from the group consisting of elements from Groups 1 and 2 of the Periodic Table; and
 (2) Q is an N-cyclopentyl-N-methylpyrrolidinium cation.

3. The method of claim 1, wherein the zeolite is prepared from a reaction comprising, in terms of mole ratios, the following:

| $SiO_2/Al_2O_3$ | 25 to 200 |
|---|---|
| $M/SiO_2$ | 0.05 to 0.15 |
| $Q/SiO_2$ | 0.15 to 0.25 |
| $OH/SiO_2$ | 0.20 to 0.30 |
| $H_2O/SiO_2$ | 20 to 35 | wherein:
 (1) M is selected from the group consisting of elements from Groups 1 and 2 of the Periodic Table; and
 (2) Q is an N-cyclopentyl-N-methylpyrrolidinium cation.

4. The method of claim 1, wherein the zeolite has a composition, as-synthesized and in the anhydrous state, in terms of mole ratios, as follows:

| $SiO_2/Al_2O_3$ | 25 to 400 |
|---|---|
| $Q/SiO_2$ | 0.02 to 0.10 |
| $M/SiO_2$ | 0.02 to 0.15 | wherein:
 (1) Q is an N-cyclopentyl-N-methylpyrrolidinium cation; and
 (2) M is selected from the group consisting of elements from Groups 1 and 2 of the Periodic Table.

5. The method of claim 1, wherein the zeolite has a composition, as-synthesized and in the anhydrous state, in terms of mole ratios, as follows:

| $SiO_2/Al_2O_3$ | 25 to 200 |
|---|---|
| $Q/SiO_2$ | 0.02 to 0.10 |
| $M/SiO_2$ | 0.02 to 0.15 | wherein:
 (1) Q is an N-cyclopentyl-N-methylpyrrolidinium cation; and (2) M is selected from the group consisting of elements from Groups 1 and 2 of the Periodic Table.

* * * * *